UNITED STATES PATENT OFFICE.

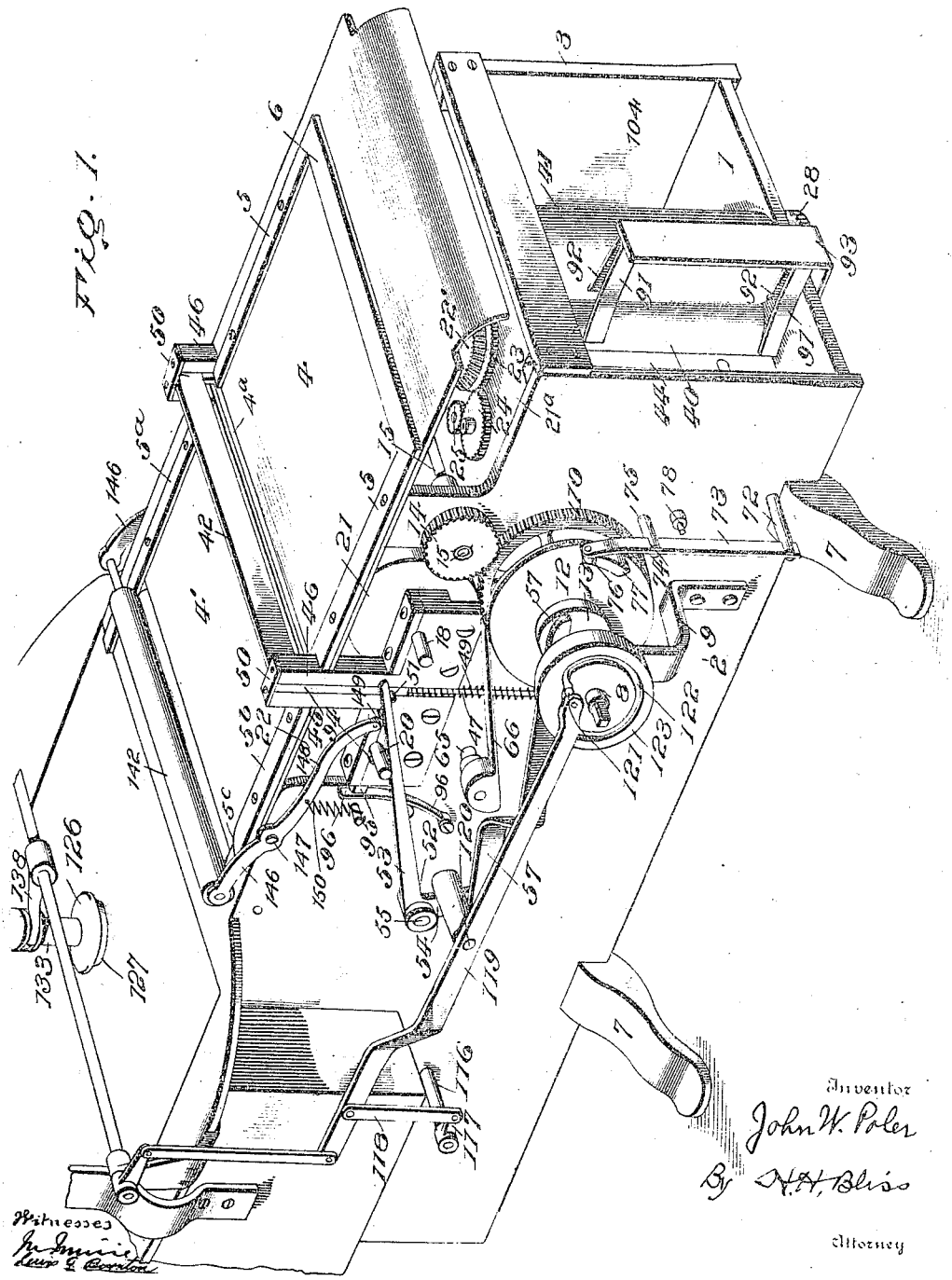

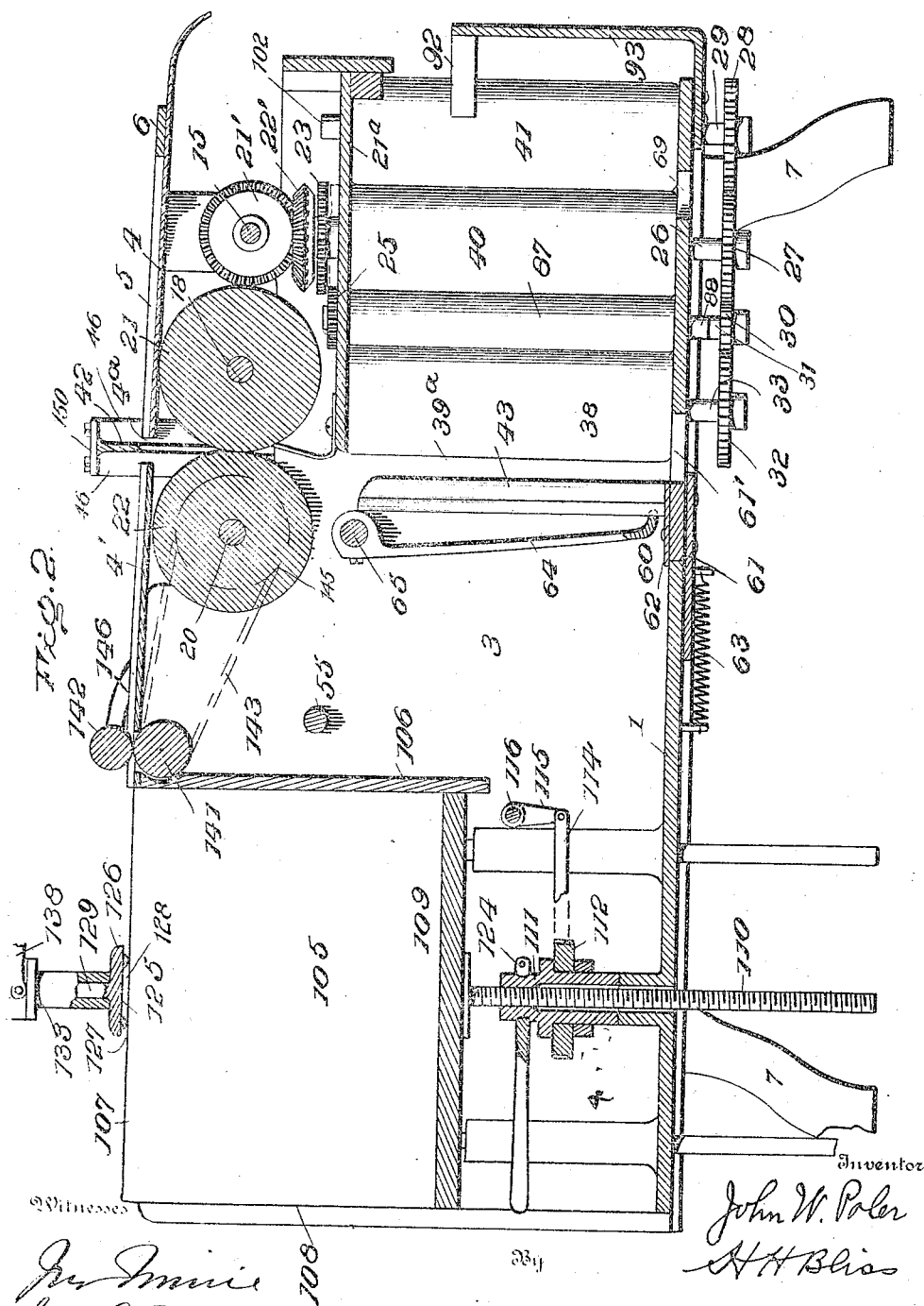

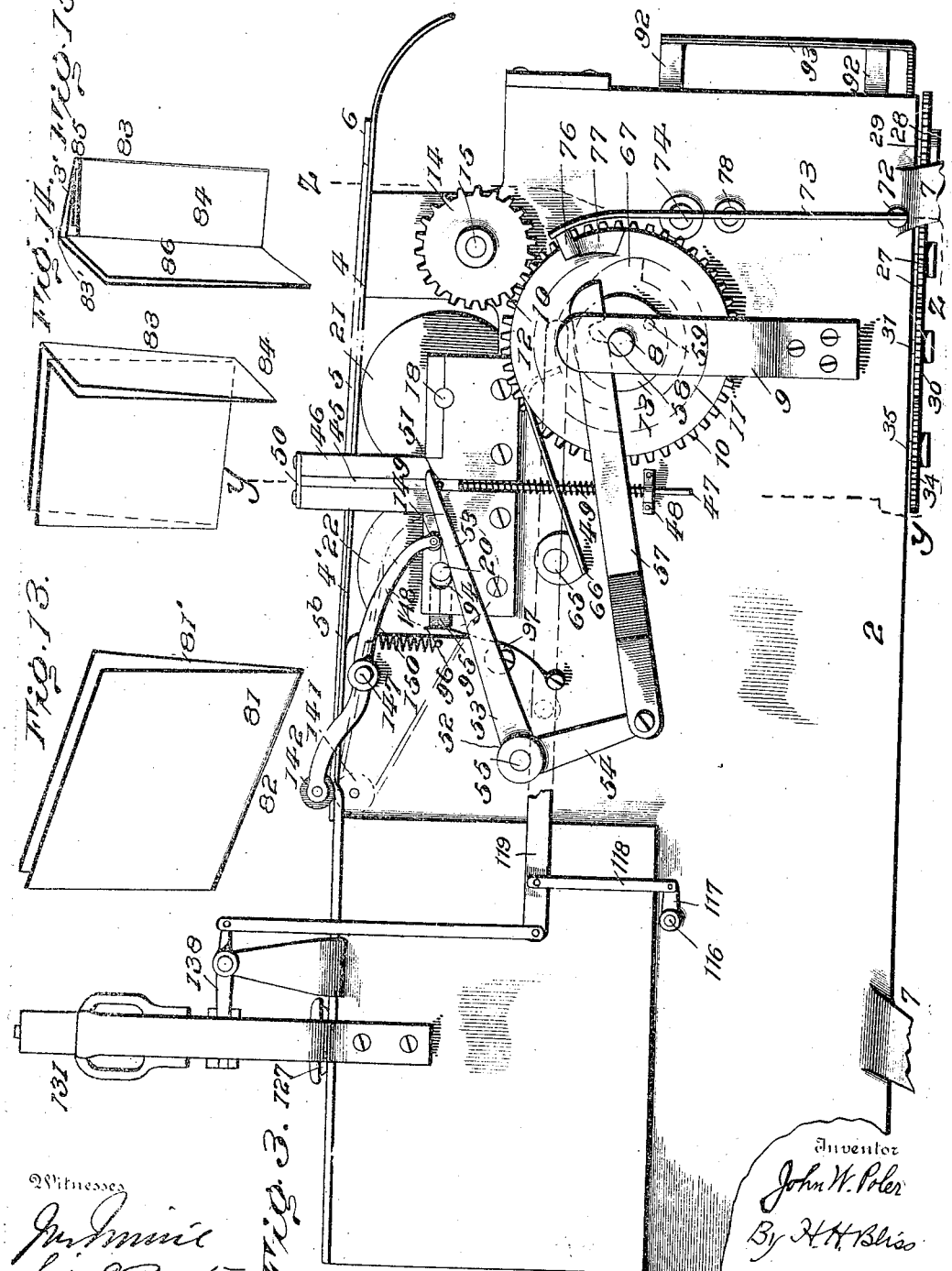

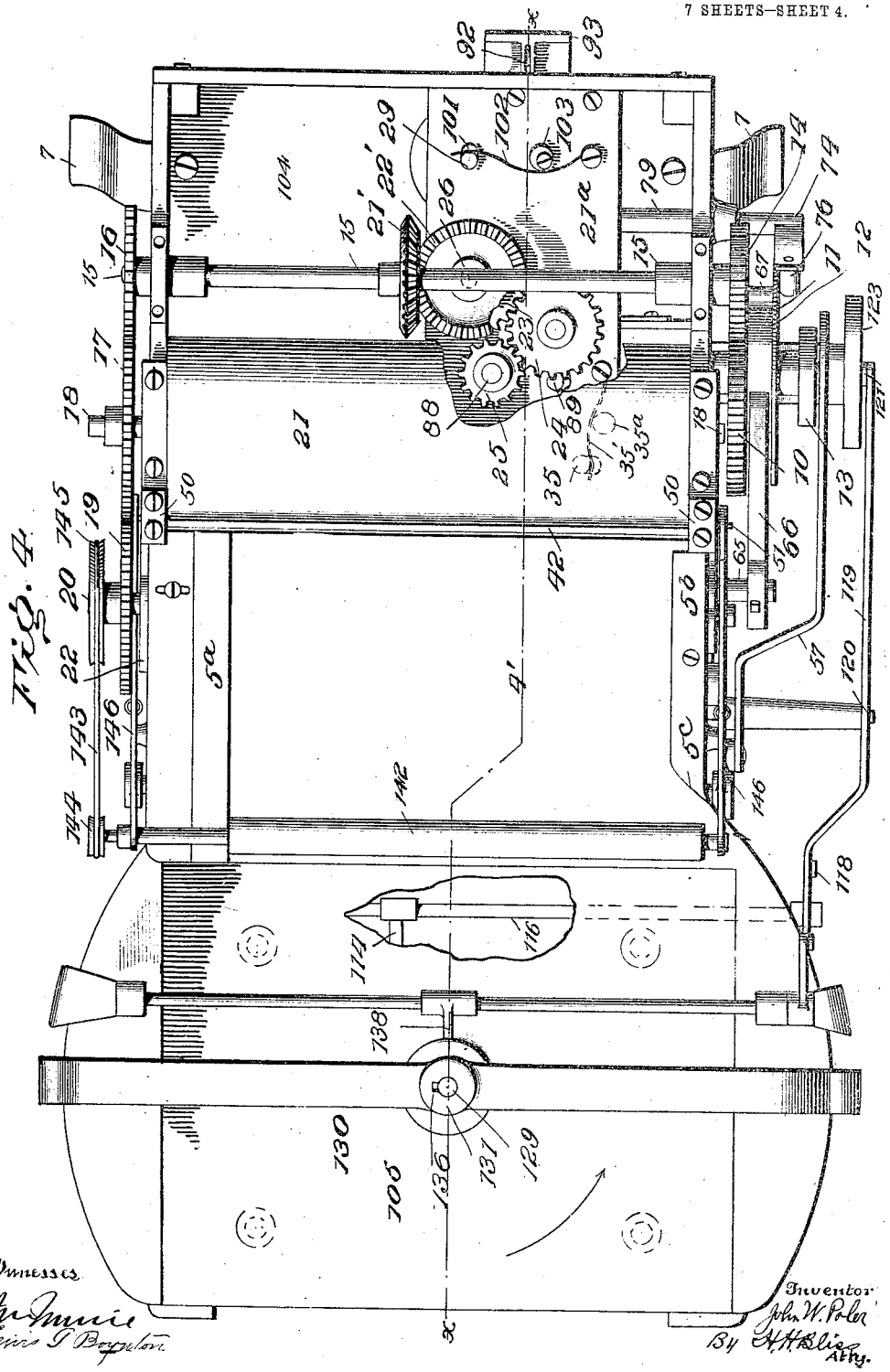

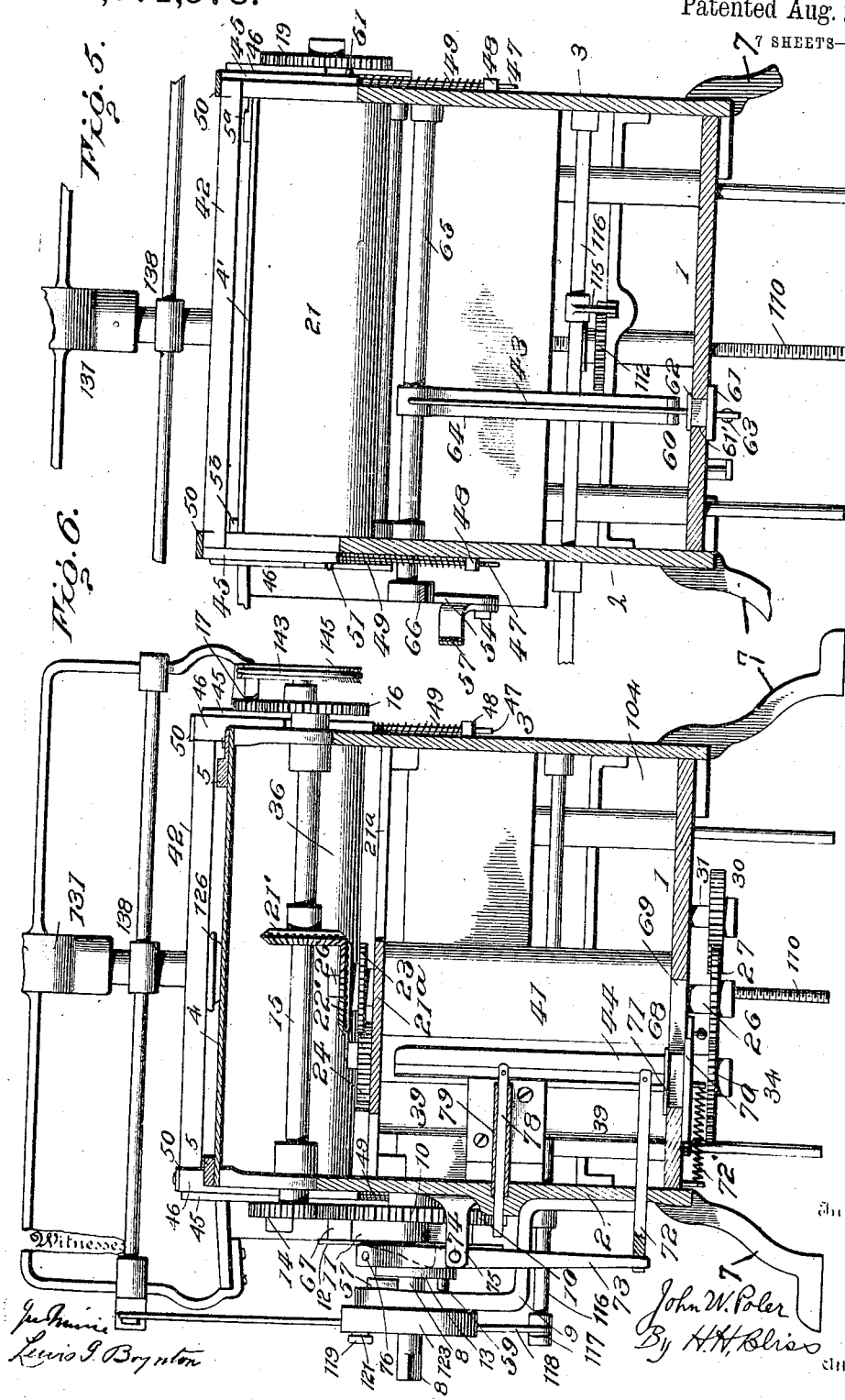

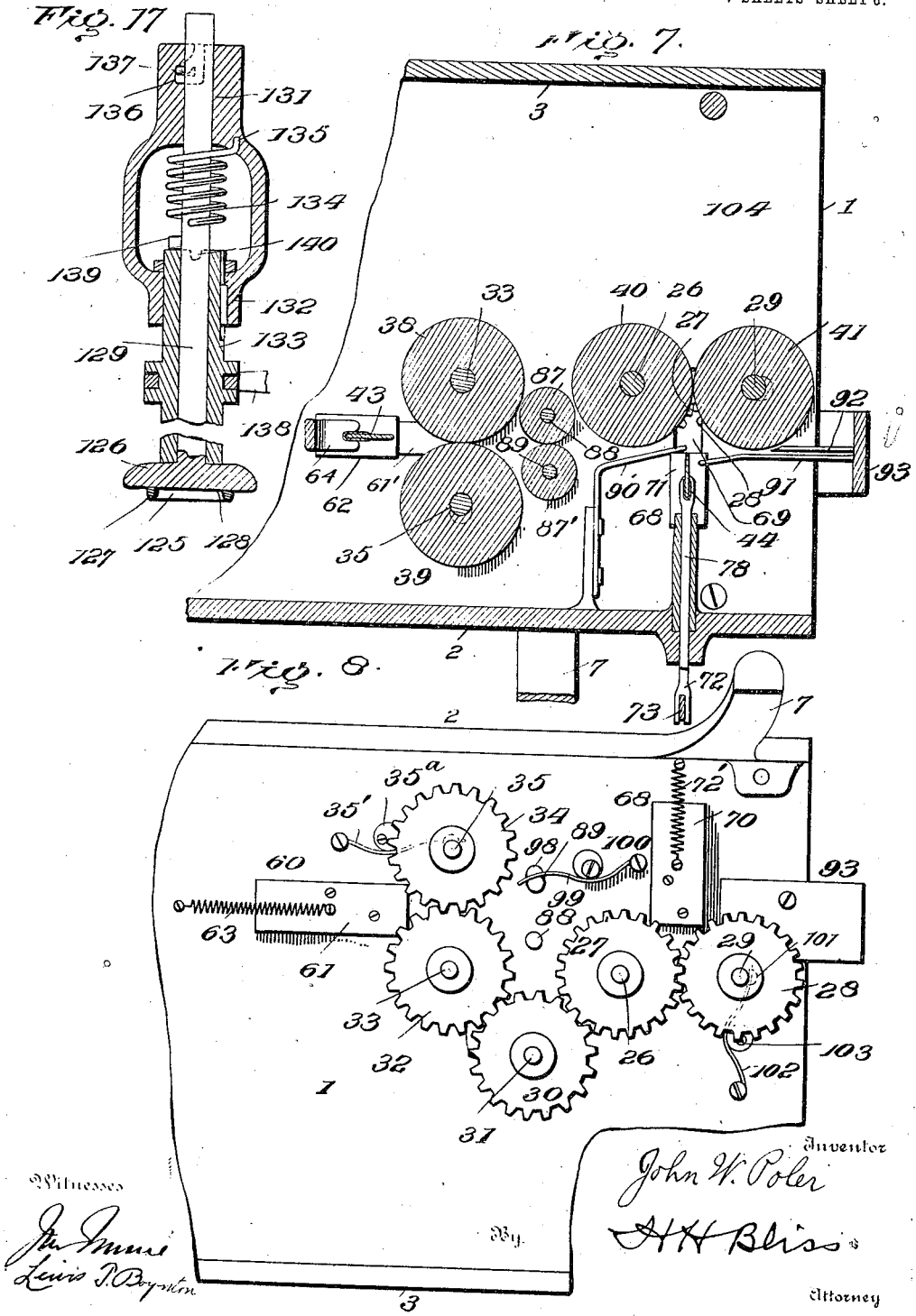

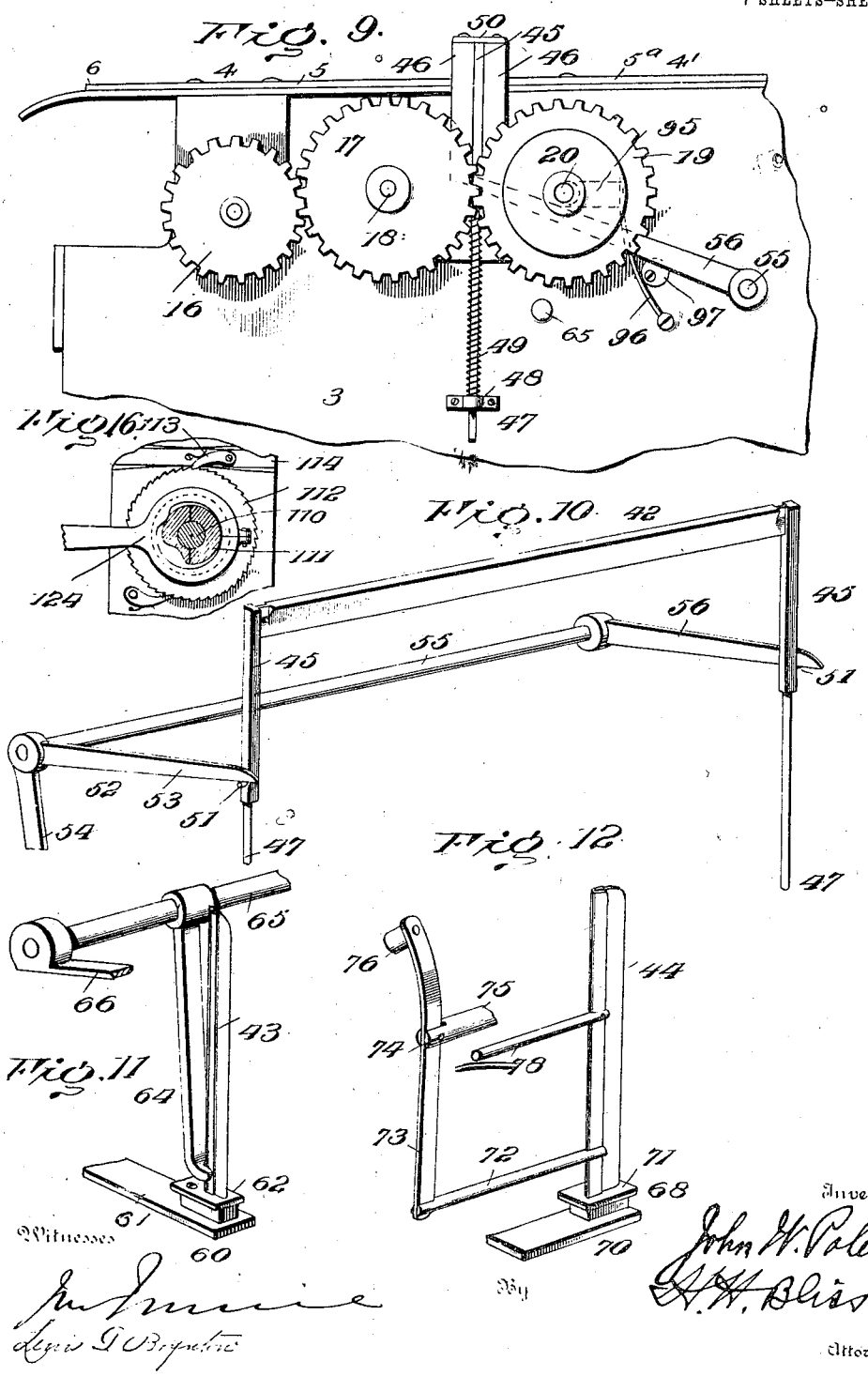

JOHN W. POLER, OF BALTIMORE, MARYLAND, ASSIGNOR TO MOLYNEUX MAILING MACHINE COMPANY, OF BUFFALO, NEW YORK, A CORPORATION OF SOUTH DAKOTA.

FOLDING-MACHINE FOR LETTERS.

1,071,573.  Specification of Letters Patent.  Patented Aug. 26, 1913.

Application filed February 2, 1904, Serial No. 191,720. Renewed February 23, 1912. Serial No. 679,498.

*To all whom it may concern:*

Be it known that I, JOHN W. POLER, a citizen of the United States, residing at Baltimore, in the State of Maryland, have invented certain new and useful Improvements in Folding-Machines for Letters, of which the following is a specification, reference being had therein to the accompanying drawing.

This invention relates to mechanisms for folding letters or circulars.

It has for its object to provide a machine to which the letters may be fed and which will fold and deliver the said letters or circulars ready to be inserted into envelops.

Figure 1 is a perspective view showing a mechanism embodying my improvements. Fig. 2 is a longitudinal vertical section on the line X—X of Fig. 4. Fig. 3 is a side elevation. Fig. 4 is a top plan view, part of the top plate being removed. Fig. 5 is a vertical section on the line Y—Y Fig. 3. Fig. 6 is a vertical cross section on the line Z—Z of Fig. 3. Fig. 7 is a partial horizontal section. Fig. 8 is a partial bottom plan view. Fig. 9 is a partial elevation opposite to that in Fig. 3. Fig. 10 is a perspective of one of the paper pushing devices. Fig. 11 is a perspective of a part of another set of devices for pushing the paper. Fig. 12 is a perspective of a part of a third set of paper pushing devices. Fig. 13 is a perspective showing the sheet of paper after the first fold. Fig. 14 is a perspective of the paper after the second bend. Fig. 15 is a perspective of the paper after the third bend. Figs. 16 and 17 show some of the details for initially supplying paper sheets to the folding mechanism.

In the drawings a frame work is shown having the bottom 1, the side walls 2 and 3, these being supported upon legs or standards 7. It will be understood that the frame-work can be modified in any desired way as any of several sorts will be suitable. The frame-work carries at the top a paper table or support having the horizontal plates 4—4′ which have a slot or passageway 4ª for the downward passage of the sheets of paper. The paper table is provided with side guides, those upon one side being shown at 5—5ª and those upon the other at 5—5ᵇ. The guide flange 5ᵇ is somewhat shorter than that at 5ª for a purpose to be described.

6 represents the stop against which the paper impinges when it reaches the end of the inward movement and before the folding commences.

Power for actuating the operative parts is transmitted through the main shaft 8 which is mounted transversely in the frame above described there being also preferably a supplemental bracket at 9 secured to the main frame for giving the shaft ample support. On the shaft 8 there are the spur wheel 10, the cam 11 the cam plate 12 and disk 13 carrying an eccentric pin. The wheel 10 engages with the wheel 14 on a cross shaft 15. At the opposite end this cross shaft 15 has a gear wheel 16 which meshes with the wheel 17 on a shaft 18 parallel to that at 15. The wheel 17 engages with the wheel 19 on another parallel shaft 20. Upon these two shafts, 18 and 20, are secured the first pair of paper gripping and advancing rolls, 21, 22. The shaft, 15, has a bevel wheel, 21′, engaging with a horizontal wheel, 22′. The latter is connected to a vertical shaft, 26, which is mounted at its upper end in a supplemental frame plate, 21ª, and at its lower end in the bottom plate 1. Below the bevel wheel, 22′, there is a spur wheel, 23, which meshes with an idler wheel, 24. The latter engages with a wheel, 25, on a vertical shaft, that will be further described below. The shaft, 26, at its lower end carries a spur wheel, 27, which engages with a wheel, 28, on the lower end of a second vertical shaft, 29. The wheel, 27, also engages with an idler wheel, 30, on a stud shaft, 31, and the latter wheel drives a wheel, 32, on the lower end of a shaft, 33. The wheel, 32, in turn engages with the wheel, 34, on the lower end of a vertical shaft, 35. On the shaft, 33, there is secured one of a vertical pair of rollers, 38 and 39, the latter being secured to the shaft, 35.

40 is a vertical roller secured to the shaft, 26, and 41 is a companion roller secured to the shaft, 29.

The three pairs of rollers just referred to are the principal means for imparting the three desired folds to the paper.

The paper is initially fed from its position on the plates, 4—4′, to the first rollers, 21—22, by means of a push bar, 42, which normally occupies a horizontal position on line directly above the planes of the top paper bed. It is intermittingly drawn downward across the center of the paper at line 82 thereof and in turn draws the paper through the slot, 4ª, and brings it to the tangent line of the rollers, 21—22. The paper is by these rollers bent and creased so as to be in the condition and shape shown in Fig. 13. It drops from between the rollers, 21 and 22, into the space at 39ª by the sides of the first vertical rollers, 38 and 39.

The reciprocating feed bar, 42, is actuated as follows: It is attached at its ends to slide guides, 45, which are mounted in a guide way formed of stationary guides, 46, secured to the frame. The slide guides, 45, extend downward some distance and the bottom has the form of rods, as at 47, passing through stationary guides or tracks, 48. 49—49 are springs, one at each side of the frame and each engaging with one of the slide guides. They normally tend to push the bar, 42, to the upper end of its path, its movement being limited by the stop plates, 50. 51—51 are pins projecting from the slide guides, 45. With each pin there engages a rock bar or crank arm, one at 53 and the other at 56. That at 53 is part of a bell lever, 52 having the arm 54. This bell lever, 52, and the crank arm, 56, are secured to the rock shaft, 55, mounted transversely in the frame. 57 is a link extending from the crank arm, 54, to points adjacent to the shaft, 8. It has a cam notch, 58, which permits the intermittent engagement of the link, 57, with the eccentric or crank pin, 59, on the disk, 13. It will be seen that at each revolution of the shaft, 8, the pin will engage temporarily with the link, 57, and impart an endwise movement to it which in turn will rock the bell lever and cause the arms, 53 and 56, to draw down on the slide bar, 45, of the paper pushing bar, 42.

After the paper has been brought down by the devices just described to the rollers, 21 and 22, and has been by them creased or folded, and has been deposited in the space 39ª, it is then acted upon as follows: 43 is the second reciprocating and paper advancing device. It has a vertically arranged bar supported by a slide guide, 60, at the bottom. This slide guide is mounted in a guide way, 61'. It has a guide plate, 61, below the frame plate, 1, and a guiding and retaining plate, 62, above. 63 is a spring connected to the slide guide and also connected to a stationary holder on the frame. The spring normally holds the paper push bar, 43, in its rearmost position. But it is intermittingly advanced toward the tangent line of the rollers, 38 and 39, as follows: 64 is a vibrating crank arm or finger situated behind the bar, 43, and having its lower end normally in contact with the bar, and at a point as near as possible to the lower end of the latter. The crank arm, 64, is attached to a rock shaft, 65, mounted transversely in the frame. To the end of the shaft is secured a crank arm, 66, which extends toward the cam disk 11 on the main shaft, 8. This shaft has a cam, 67, which at each revolution of the shaft, 8, engages with the crank arm, 66, and imparts such motion thereto that through the rock shaft, 65, and the crank arm, 64, it causes the bar, 43, to advance toward the rollers, 38 and 39. This movement is imparted to the bar, 43, immediately after the paper drops from the rollers, 21 and 22, into the space, 39ª. The bar, 43, engages with the folds, 81 and 81', of the paper sheet at the line, 83, see Fig. 14, and presses that line of the paper between the rollers, 38 and 39. They immediately press against it and carry it over from the bar, 43, which immediately is returned under the action of the spring, 63. The paper under the pressure and rotation of the rollers, 38 and 39, is advanced toward those at 40—41. When it gets into proper position it is caused to move on lines transverse to those of its last movement, as follows: 44 is a third paper pressing bar arranged to reciprocate toward and from the tangent line of the rollers, 40—41. This bar, 44, has its lower end secured to a slide guide 68 mounted in a guide way, 69, in the frame bottom, 1. The slide guide has a plate, 70, below the plate, 1, and a retaining plate, 71, above it. A spring, 72', is connected to the slide bar so as to hold it in its inactive position. The paper push bar, 44, is advanced intermittingly by a thrust bar, 72, engaged by a lever, 73. The latter is pivoted at 74 to a frame bracket, 75. At its upper end there is a pin and roller at 76 which is situated near the face of a cam disk, 12, the latter carrying the cam, 77. To hold the paper push bar, 44, in correct position vertically there is preferably a supplemental guide provided by means of a slide rod, 78, fitted to a guide way at 79, which is here in the form of a tube extending in from the frame.

It will be seen that once during each revolution of the shaft, 8, the paper bar, 44, will be advanced toward the tangent line of the rollers, 40 and 41. This occurs immediately after the paper has been carried away from the rollers, 38 and 39. It reaches the position adjacent to the rollers, 40 and 41, and the bar, 44, in the shape shown in Fig. 14. The bar, 44, presses against it on the line, 83', and pushes it between the rollers, 40 and 41, which immediately grasp it and complete the folding of the sheet on said line, 83', and carries it through to the space or chamber at 104 where it is delivered in the form and shape shown in Fig. 15.

In order to carry the paper properly from the rollers, 38 and 39, and place it in the correct relation with the rollers, 40 and 41, use is made of the supplemental rollers, 87 and 87', one carried on shaft 88 and the other on shaft 89. Shaft 88 is connected with the wheel, 25, above referred to, which receives motion from the wheel, 24. The roller, 87', is driven by pressure and friction only.

At 90 there is a stationary paper guide in the form of a wall or bar so situated as to direct the paper along the proper path. On the other side of the paper bar, 44, there is a stationary paper guide composed of the relatively long arms, 91, and the relatively short arms, 92, preferably arranged in an upper pair and a lower pair carried by a bracket, 93, secured to the frame.

One of the rollers of each pair is so mounted that it can yield slightly when demanded either because of the pressure from the bars, 42, 43, and 44, or because of varying thickness of the paper. Of the first pair, roller 22 is the one that yields. The shaft, 20, passes through elongated apertures, 94, in bearings at the sides of the frame. 95—95 are bars which slide in guide ways in the metal of the bearings and against these bars are springs, 96, which tend to keep the bars, 95, and the shafts, 20, in their forward position. But when it is necessary for the roller, 22, to yield backward this is permitted by the springs. The tension of spring, 96, is adjusted by an eccentric abutment, 97. Of the second pair of rollers, that at 39 is similarly mounted, that is to say, the end portions of its shaft, 35, pass through elongated apertures in the frame plates, 1, and 21ª, and against the shaft ends bear springs, 35', whose tension can be adjusted by the eccentric abutment, 35ª. The roller, 87', can yield in similar manner as its shaft, 89, which passes through elongated apertures, 98, and bears against a spring, 99, held in place by an adjusting eccentric, 100. The roller, 41, and its shaft ends pass through elongated apertures, 101, in the bearing plates, and against these ends springs, 102, press, which are held in place by adjusting eccentrics, 103.

The parts that have been above described can be used for folding sheets of paper when initially fed by hand. It is preferable, however, to deliver the sheets to the folder by automatic devices and in the drawings an improved mechanism for this purpose is shown.

105 indicates a receptacle adapted to hold a mass of folded sheets of paper such as are to be folded in the above described apparatus. It has a forward wall, 106, and side walls, 107. On the rear side, 108, it is preferably left open so that the paper sheets can be readily put in position. 109 is a movable bottom or follower for this chamber and upon which the mass of paper rests. The sheets are successively withdrawn from the top of the mass, and the follower, 109, moves up with a speed corresponding to that of the withdrawal of the top sheets. This upward movement can be accomplished in any desired way. As shown, there is a threaded nut, 110, which projects down from the bottom, 109. With it engages a nut, 111, which is intermittingly rotated by means of a ratchet wheel, 112, and the pawl, 113. The pawl, 113, is pivoted on a reciprocating slide bar, 114, and receiving motion from a crank arm, 115, carried by a rock shaft, 116. The rock shaft has at its other end a crank, 117, to which is pivoted a link, 118, which in turn is pivoted to a lever, 119, mounted at 120 upon a frame bracket. The lever, 119, is vibrated by means of a pin, 121, fitting in a cam groove, 122, in the disk, 123, secured to the main shaft, 8. At each revolution of the shaft there is transmitted through the lever, 119, the link, 118, the crank shaft, 116, and pawl, 113, a step movement to the ratchet wheel, 112, and to the nut, 111. This results in a slight upward movement of the follower, 109.

The nut, 111, is formed in two separable parts which are normally held together by means of a lock ring, 124, and this permits the opening of the nut when it is desired to quickly return the follower to its lowermost position.

The sheets of paper are automatically removed from the top of the file in the receiver as follows: 125 is a gripping device. Preferably it is of the nature of a rubber cup. As shown, it comprises a holder, 126, to which is secured a ring of rubber at 127, there being a chamber at 128. This gripper is brought down intermittingly upon the sheets and given a part of a revolution at each operation. The sheets of paper in the initial pile in the holder, 105, lie with their longer lines at right angles to the path which they take as they begin to move through the folding mechanism. Each sheet at the top is turned in the direction of the arrow in Fig. 4, the turning continuing until one edge of the sheet comes against the guide flange at 5ª. The opposing guide flange 5ᵇ is cut away at 5ᶜ, as above described, to allow of this quarter turn of the sheet. The gripper, 125, is thus reciprocated and partially rotated as follows: It is carried by a stem or shaft, 129, which extends upward through bearings in a bracket, 130, the bearings being shown at 131, 132. This shaft is surrounded by a sleeve, 133, at its lower end, this sleeve being fitted to the bearing, 132. 134 is a spring connected to the shaft, 129, and to the bearing metal or bracket at 135. To wind, or store force in, the spring, use is made of the hand-groove, 136, in the bearing, 131, in which travels a pin, 137, secured to the shaft, 129. The shaft, 129, is intermittingly moved upward longitudinally by means of a lever, 138, which engages with the sleeve, 133. As the shaft moves upward its pin, 137, moves along the inclined part of the cam-slot and thus giving a partial rotation to the shaft. 139 is another pin projecting laterally from the shaft 129, and 140 is a notch in the end of the sleeve, 133. When the shaft, 129, is caused to partially revolve, as described, the pin 139 reaches and seats itself in the notch 140. Then when the lever 138 moves downward, the shaft, 129, follows, because of the downward acting tension of the spring, 134; the pin, 137, during this downward movement traveling in the vertical straight portion of the cam-slot. When the shaft, 129, and the gripper, have reached the lower point in their travel, the gripper engages with the top sheet of the paper just at the instant that the pin, 137, reaches the bottom horizontal straight part of the cam-slot. This permits the torsional tension of the spring, 134, to exert itself upon the shaft, 129, and upon the gripper, 125, imparting a quarter of a revolution to them and a corresponding part of a turn to the top sheet of paper. After the sheet of paper has been turned from the position occupied by it in the holder, 105, to that which it takes when commencing to move through the folding mechanism, it is grasped by an initial feed mechanism which causes it to move longitudinally over the bed plates 4' and 4 up to and against the stop flange at 6. As shown this mechanism consists of two rollers, 141 and 142. The roller, 141, is mounted transversely in the frame in such a position as to have the upper line of its surface in or slightly above the horizontal plane of the paper sheet after it has been turned by the gripper, 125. This roller is constantly rotating, being driven by a cord or belt, 143, which engages with the pulley, 144, on the roller shaft, and with the driving pulley, 145, on the shaft 20 of the roll 22. The roller, 142, is intended for exerting pressure on the upper surface of the sheet of paper. It is mounted on a swinging arm or frame, 146. These are pivoted outside of the main frame as at 147. One of these has an arm, 148, which carries a pin and roller, 149, normally resting upon the upper edge of the above described crank arm, 53. At 150 is a spring connected to this arm, acting to draw it downward and to lift the roller, 142, up. It will be seen that with these parts there is an intermitting pressure exerted upon the bottom roll 141, and when such pressure is exerted, any paper that is between the rollers will be advanced because of the rotation of the lower one.

The action of the several parts and the mode of operation of the entire machine above described will be readily understood from the drawings.

Power is imparted to the main shaft, 8, in a suitable way by means of the belt and belt pulley. Assuming that the roller, 142, is in its elevated position and that a sheet of paper is at the top of the pile in the holder, 105, and in proper position, with the gripper, 125, elevated, the steps that take place are as follows: The gripper, 125, descends and, just as it reaches the lower limit of its movement, it receives a quarter revolution which turns the top sheet of paper in the way described into alinement with the passageway of the folding devices. The instant the paper takes this position, the roller, 142, descends and presses upon the roller, 141, which feeds it forward until its front edge strikes the stop flange, 6. Thereupon the paper bar, 42, immediately descends, creasing the paper in the middle and delivering it to the tangent line of the rollers, 21 and 22, which finish the bending or creasing and forces the paper downward. It then drops into the space at 39ª and is instantly engaged by the knife bar or feed bar, 43, along the line, 83, and forced between the rollers of the second pair. The first transverse fold as in Fig. 14, is here imparted. It then passes between the rollers, 87 and 87', into proper position in front of the rollers, 40 and 41, of the third pair, where it is immediately engaged by the knife bar or push bar, 44, along the line, 83', and is caught by these rollers and the third or final crease or bend is given to it.

I claim—

1. In a paper folding machine, the combination of a pair of horizontally arranged folding rolls, a feed bar adapted to direct a sheet of paper downward between said rolls, a pair of folding rolls arranged vertically beneath said pair of horizontal folding rolls and having their plane of tangency at right angles to the plane of tangency of said horizontal pair of folding rolls, and at one side of the central transverse plane through the said horizontal folding rolls, a feed bar for directing a sheet of paper between said pair of vertical folding rolls, a third pair of folding rolls arranged vertically and having their plane of tangency at right angles to the plane of tangency of said pair of second folding rolls, a feed bar for directing the sheet between said last pair of folding rolls, a pair of vertically arranged sheet-guiding and advancing rolls interposed between said pairs of vertically arranged folding rolls, means for simultaneously operating one roll of each of said pairs of rolls, and means for timing the operation relatively to each other of the feed bars for each pair of folding rolls.

2. In a paper folding machine, the combination of a pair of horizontally disposed initial folding rolls, means for feeding a sheet of paper thereto, a pair of vertically disposed folding rolls arranged at right angles to the primary folding rolls, means for feeding the sheet of paper to the said second pair of folding rolls, a pair of rotary guiding and advancing rolls arranged to receive the said sheet as it issues from the said second pair of folding rolls, a third pair of folding rolls arranged parallel to the said second pair of folding rolls, and means for feeding to the said third pair of folding rolls the sheet of paper directed from the said pair of guiding and advancing rolls.

3. In a paper folding machine, the combination of a pair of horizontally disposed folding rolls, a pair of vertically disposed folding rolls arranged beneath and tangent to the vertical plane of contact of said first pair of rolls and adapted to make a fold in the sheet of paper as folded by the first pair of rolls on a line at one side of the central line of said folded sheet, and at right angles to the line of the first made fold, a second pair of vertically disposed folding rolls arranged tangent to the vertical plane of contact of said second pair of folding rolls and adapted to make a fold in the folded sheet as delivered from the first pair of rolls, which last fold will overlap the fold made by the said second pair of rolls, a plurality of feed bars, each adapted to direct the sheet to be folded between the rolls of one of said pairs of folding rolls, a main power shaft, actuating devices interposed between said power shaft and each of said feed bars, and power transmitting devices interposed between said power shaft and one roll of each of said pairs of rolls.

4. In a paper folding machine, the combination of a pair of horizontally disposed initial folding rolls, two pairs of vertically disposed folding rolls arranged beneath the horizontal plane containing the axes of said initial folding rolls, one of said pairs of vertically disposed folding rolls being arranged tangent to the vertical plane of contact of said horizontally disposed folding rolls and adapted to fold a sheet of paper after it has been folded by the initial pair of folding rolls, and the second pair of vertically disposed folding rolls being arranged tangent to the vertical plane of contact of said first described pair of vertically disposed folding rolls and adapted to fold the sheet of paper after it has been folded by the first pair of vertical folding rolls, feed bars, each adapted to direct the sheet of paper between one of said pairs of folding rolls, a horizontally disposed cam shaft arranged at one side of said pairs of vertical folding rolls, actuating devices interposed between said cam shaft and each of said feed bars, and power transmitting devices interposed between said cam shaft and one roll of each of said pairs of folding rolls.

5. In a folding machine, the combination of a pair of horizontal folding rolls, a vertically reciprocating feed bar adapted to be moved into and out of the inlet between said rolls, rock levers arranged on opposite sides of the machine and each engaging downwardly with a pin or shoulder at one end of the feed bar, a rock shaft carrying said rock levers, springs operating to raise said feed bar, and a cam operatively connected with said rock shaft and adapted to turn the same and the rock levers in the direction for depressing said feed bar.

6. In a machine of the class described, the combination of a frame having horizontally arranged top and bottom walls and a supplemental bearing plate between them, the top wall having a guideway for the sheet of paper to be folded and a transversely arranged slot through which the sheet may be pressed, a pair of horizontally disposed folding rolls having their line of tangency directly beneath said slot, a feed bar for directing the sheet through said slot and between said folding rolls, a pair of vertically disposed rolls having their plane of tangency at right angles to the plane of tangency of said pair of horizontal rolls, and at one side of the vertical central transverse plane through the latter, a second pair of vertical folding rolls having their plane of tangency at right angles to the plane of tangency of said first pair of vertical rolls, all of said vertical rolls being mounted at their upper ends in bearings carried by said supplemental bearing plate and at their lower ends in bearings carried by said bottom plate, feed bars, each adapted to direct the sheet of paper between the rolls of one of said pairs of vertically disposed rolls, and means for actuating one roll of each pair of folding rolls.

In testimony whereof I affix my signature in presence of two witnesses.

JOHN W. POLER.

Witnesses:
Thos. Kell Bradford,
Lee Purcell.